T. BURDEN & E. A. MARTIN.
APPLIANCE FOR INDICATING OR CORRECTING ERRORS IN PRINTERS' GALLEYS.
APPLICATION FILED OCT. 20, 1913.
1,128,222.
Patented Feb. 9, 1915.
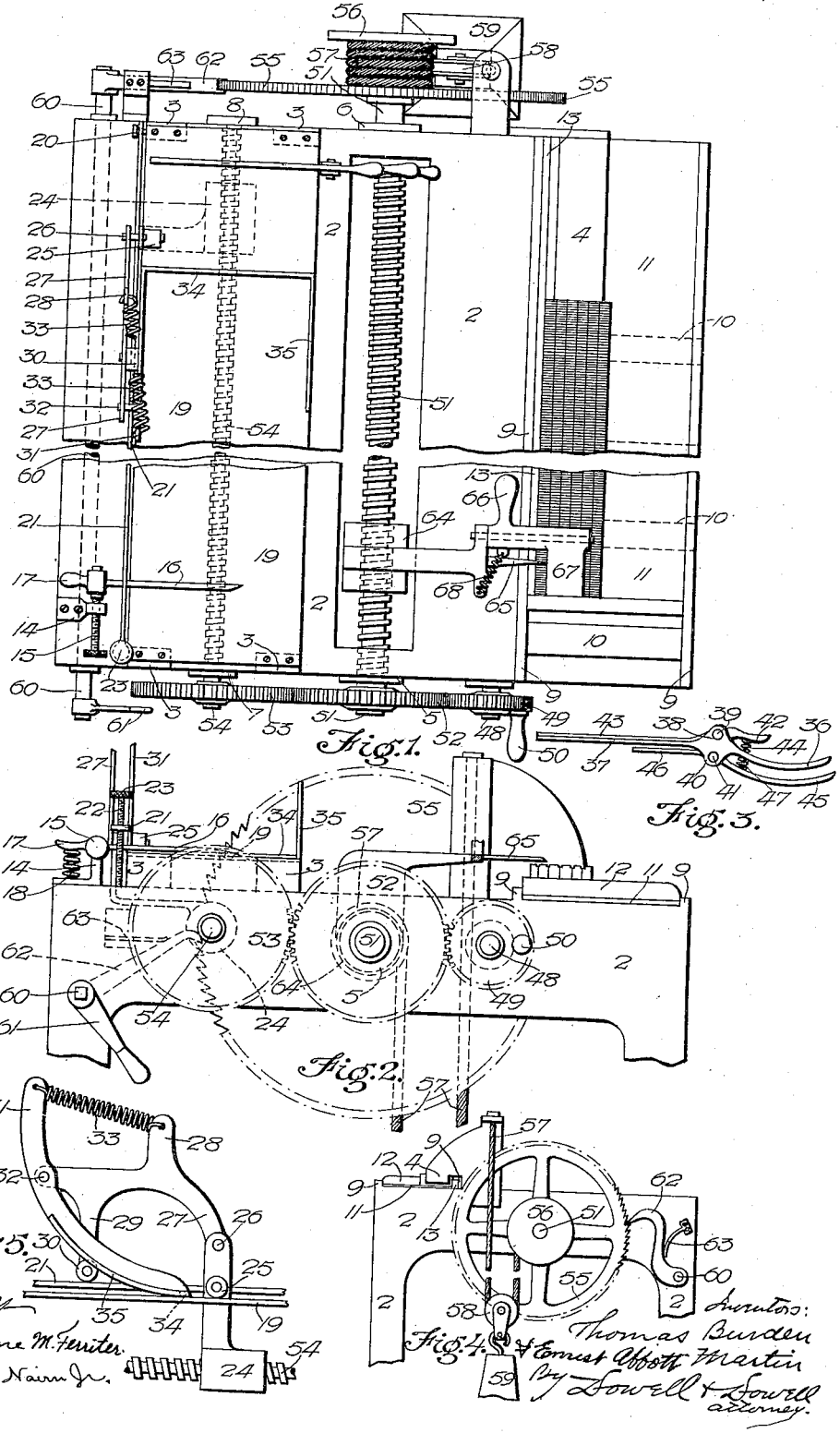

UNITED STATES PATENT OFFICE.

THOMAS BURDEN AND ERNEST ABBOTT MARTIN, OF WARRNAMBOOL, VICTORIA, AUSTRALIA.

APPLIANCE FOR INDICATING OR CORRECTING ERRORS IN PRINTERS' GALLEYS.

1,128,222. Specification of Letters Patent. Patented Feb. 9, 1915.

Original application filed January 15, 1913, Serial No. 742,222. Divided and this application filed October 20, 1913. Serial No. 796,206.

*To all whom it may concern:*

Be it known that we, THOMAS BURDEN and ERNEST ABBOTT MARTIN, subjects of the King of Great Britain and Ireland, and residents of the town of Warrnambool, in the county of Villiers, State of Victoria, Commonwealth of Australia, have invented a certain new and useful Appliance for Indicating or Correcting Errors in Printers' Galleys, of which the following is a specification.

In the specification of the concurrent patent application of the present applicants, Ser. No. 742,222, filed on the 15th day of January, 1913, an appliance has been disclosed whereby when correcting printers' galleys the necessity of reading the metallic type thereof is obviated.

The present invention, which is a division of that above mentioned application, aims at providing an appliance for use chiefly with hand set matter. The basic application referred to provides an appliance for use with line cast matter. Both appliances, however, involve the same fundamental feature consisting in automatically locating a line in the galley by the location of the corresponding line upon the proof sheet. So far as applicants are aware this feature is quite novel and has never been previously suggested.

In the drawings:—Figure 1 shows a plan of this invention. Portions have been broken away or removed for convenience of illustration. Fig. 2 is a front view of Fig. 1, portions being broken away and omitted for convenience of illustration. Fig. 3 is a view of a proof holder by which a proof is retained in position. Fig. 4 is a rear end elevation showing returning means. Portions have been omitted and broken away for convenience of illustration. Fig. 5 is a side elevation showing proof line indicating device. Portions have been broken away or removed for convenience of illustration.

Referring to the drawings it will be seen that the invention includes a framework 2 of any suitable character provided with proof stand brackets 3. Projecting from the right hand side of the framework, near or at the rear thereof, is a galley stop 4. Mounted in or attached to the front of the framework is a middle front bearing 5 and mounted in or attached to the rear of the framework is a corresponding middle rear bearing 6, accommodating a first threaded shaft hereinafter described. There is also provided a first bearing 7 for a second threaded shaft, hereinafter described, and a second bearing 8 for the said second threaded shaft. Extending along the right hand side of the framework are two galley guides 9. Extending or mounted between the galley guides is a series of rollers 10. Accommodated between the guides and upon the rollers is a line of type or slug carrier. This consists of a bottom 11 upstanding above which is a cross front end 12 and a longitudinal left side 13. The right side and the rear end of the carrier are open. Its bottom 11 and left side 13 are capable of passing beneath the galley stop 4. Slugs or type placed upon the carrier cannot pass the stop 4 as will be hereinafter understood. Secured to or integral with the framework at the front thereof is a bracket 14 having therein a threaded hole. Accommodated within the hole is a screw 15 having a head at its one end and a plain portion at its other. Intermediately pivoted to the plain portion of the screw 15 is a pointer arm or finger having a proof end 16 and a finger end 17. Beneath the finger end is situated a spring 18.

Carried by the proof stand brackets 3 is a proof support consisting of a plate 19. Pivoted by a pivot pin 20 at one end of the said plate is one end of a guide bar 21 the other end of which is provided with a threaded hole. Accommodated within the threaded hole is a screw 22 having a head 23 at its one end and bearing at its other end or point against the framework. The framework may be recessed to accommodate the screw point. The screw 22 regulates the angle of the guide bar 21 with the plate 19 to increase or reduce the movement of the bridging piece of an indicating frame hereinafter described, for the purpose hereinafter explained.

With the proof support is used a line indicating device consisting of a nut member 24 having therein a threaded hole. Carried by the nut member 24 is a friction guide roller 25. Pivoted to the nut member, by a pivot pin 26, is one end of a lever 27 having a spring lug 28 and a roller arm 29.

Mounted upon a stud protruding from the roller arm is a friction roller 30. This bears upon the guide bar 21 afore described.

With the stand and forming part of the indicating gear is used an indicating frame. This consists of a left side member 31 intermediately pivoted by a pivot pin 32 to the other end of the lever 27. Secured to one end of the left side member 31 is one end of a spiral or other spring 33 the other end of which is secured to the spring lug 28. Integral with the left side member 31 is a cross bridging piece 34. Integral with the bridging piece 34 is a right side member 35.

With the proof support is used a proof holder consisting of a clip having an intermediate arm provided with a finger end 36 and a proof end 37. Protruding from the arm at the finger end thereof are two upper lugs 38 between which extends an upper pivot pin 39. Protruding from the arm at the finger end thereof are also two lower lugs 40 between which extends a lower pivot pin 41. Intermediately pivoted by the pivot pin 39 is an upper arm having a finger end 42 and a proof end 43. Between the finger end 42 of the upper arm and the finger end 36 of the intermediate arm is situated an upper spiral or other spring 44. Intermediately pivoted to the pivot pin 41 is a lower arm having a finger end 45 and a support end 46. Situated between the finger end 36 of the intermediate arm and the finger end 45 of the lower arm is a lower spiral or other spring 47.

Mounted in a suitable bearing or bearings carried by the front of the framework is a driving shaft 48 having secured thereon a first toothed wheel 49 projecting from which is a handle 50. Mounted in the middle front and rear bearings 5 and 6 is a first threaded shaft 51, having secured thereon a second toothed wheel 52. Engaging (Figs. 1 and 2) the second toothed wheel 52 is a third toothed wheel 53 secured upon a second threaded shaft 54. The shaft 54 is mounted in the bearings 7 and 8 before mentioned. Upon the second threaded shaft 54 may be a thrust collar or collars. The shaft 54 passes through the nut member 24 of the line indicator gear.

Secured to the first threaded shaft 51 is a ratchet wheel 55 having a flanged boss or drum 56. Secured to the drum 56 is one end of a line or cord 57 the other end of which is secured to any suitable portion of the framework. Supported by the line or cord 57 is a pulley 58 carrying a balance weight 59.

Mounted in the framework, preferably at the left hand side thereof, is a longitudinal spindle 60. Attached to the front end of the spindle is a hand lever 61. Attached to the rear end of the spindle is a pawl 62 controlled by a spring 63 and engaging the ratchet wheel 55. By the pawl 62 and ratchet wheel 55 the threaded shafts are prevented from inadvertently rotating.

Accommodated upon the first threaded shaft 51, is a galley indicator consisting of a nut member 64 having a finger or pointer 65 protruding therefrom. Projecting from the indicator is a stud or pivot pin mounted upon which is a galley line of type or slug compressor lever having a finger portion 66, and a bearing portion 67. Controlling the galley line of type or slug compressor lever is a spiral spring 68 one end of which is secured to the said lever and the other to the galley indicator.

The cycle of operations with this invention, when adapted particularly for the correction of hand set type, is as follows:—The finger portion 66 of the galley line of type or slug compressor lever is depressed the bearing portion 67 being thus raised. The galley consisting of the set up type accommodated upon the line of type or slug carrier is placed upon the rollers 10 between the guides 9 and pushed over the rollers until the last line of type or slug bears against the galley stop 4. The finger portion 66 is now released. The upper end of a proof printed from the galley and duly corrected is placed between the proof ends 37 and 43 of the upper and intermediate arms of the proof holder. The finger end 17 of the pointer arm is depressed and the proof passed beneath the proof end 16, the plate 19 of the proof stand being then accommodated between the intermediate and lower arms of the proof holder. The proof is moved or adjusted along the plate 19 until the pointer arm is immediately beneath the last line of the proof. Every other line of the proof may now be used to determine the exact position of corresponding galley line of type or slugs. It is not intended that the adjustable pointer arm 16 should be used to make adjustments prior to the correction of each new galley. It is first adjusted so that the machine will operate correctly when the upper edge of the arm 16 is level with the bottom of the last line of proof and the galley is bearing against the galley stop 4. Another method would be to provide an adjustable galley stop. Usually only one or two sizes of type are used in newspapers and book work, when line casting machines are employed. In such circumstance there would probably be no necessity for using this adjustment. When dealing with three consecutive sizes of type however, nonpareil, minion and brevier, for example, the adjustment may be used. The difference in size between the smallest slug (nonpareil) and the largest or thickest slug (brevier) may require the position of the proof to be slightly altered. By moving the pointer the requirement regarding the position of the proof is met. Adjustment for various sizes of type may be effected by means of the screw 15 in order that the galley indicator finger 65 will always be in correct alinement with the slugs in the galley. The slight difference between the length of the printed matter of the proof and the length of the column of type in the galley, due to the line of type or slugs more tightly compressed together during printing, may also be rectified by operating the screw 22 of the guide bar 21 of the proof stand. By adjustment of the screw 22 the near or the lower end, as the case may be, of the guide bar 21 is moved, for example, nearer to the plate 19. The bar is then inclined to and not parallel with the plate 19. As the nut 24 moves toward the near or lower end, as the case may be, of the threaded shaft 54, the roller 30 moves down the incline. The arm 29 in consequence approaches the plate 19 as the nut 24 proceeds, the lever 27 pivoting upon the pin 26. The arm 29 carries with it the indicating frame which under the influence of the spring 33 pivots upon the pin 32, the bridging piece 34 thereby gradually receding from the roller 30 and moving nearer the nut 24. Therefore, as the roller 30 progresses along the inclined bar 21, although the movement of the nut 24 in relation to the shaft 54 is necessarily constant, the travel of the bridging piece 34 becomes necessarily less and less as the inclination of the guide bar 21 approaches plate 19. The closer the guide bar 21 is to the plate 19, the more restricted is the movement of the bridge piece 24. The inclination is very minute to give a decrease in the movement of the bridging piece of a width of one slug. The bridging piece moves at practically the same speed all the time—that is to say, the speed does not gradually slacken as it moves along the plate 19, but the bridging piece in moving from the top to the bottom of plate 19, travels a total distance of the width of one slug (more or less according to adjustment) less than the total distance traveled by the carriage or slug ejecting mechanism. If there is any gradual slowing down, in case of the lines being closer together at one end of the proof than at the other, it is imperceptible in actual practice. Generally the whole galley, when the proof is being printed, is equally compressed along its whole length, although there is a tendency of the roller moving over the type to produce the effect described. It is, however, not sufficient to require any variation in the movement of the bridging piece. The movement of the line indicating gear and the indicating frame thereof is thereby adjusted and the finger 65 is always in alinement with the line of the galley corresponding to that in alinement with the bridging member 34 of the indicating frame. The first toothed wheel 49 by its handle 50 may now be rotated, rotating the first threaded shaft 51 and the second threaded shaft 54. As the shafts rotate the nut members 24 and 64 move along the same synchronously. Immediately the bridging piece 34 reaches a corrected line upon the proof the operative ceases to rotate the handle 50. The line indicated in the galley by the finger or pointer 65 may now be corrected by the said operative. To return the indicating frame and the finger or pointer 65 the hand lever 61 is operated partially turning the spindle 60 and disengaging the pawl 62 from the ratchet wheel 55. The weight 59 upon the line 57 now causes the drum 56, to which it is attached and around which it is wound, to rotate. This rotates the first threaded shaft 51 in a reverse direction to its former rotation. When a series of corrections have been made to the galley the type therein, which has been passed by the galley indicator or the carriage, would be loose on account of the moving of the type by the operative. To prevent the type not corrected also becoming loose the galley line of type or slug compressor lever is employed the bearing portion 67 resting upon the type under the influence of the spring 68 and traveling over the same with the galley indicator or carriage. The uncorrected type in the galley is thereby maintained in a compact condition.

It is to be understood that the invention is not limited to the details of construction described and illustrated as various modifications and arrangements may be made without departing from the spirit and scope of the said invention. For example a sliding proof line indicator and a sliding galley line indicator of any suitable nature may be employed with a metallic tape or like connection therebetween so that upon the proof indicator being moved by hand or otherwise to a given line the galley indicator moves to the corresponding line in the galley.

Having now described our invention, what we claim as new and desire to secure by Letters Patent is:—

1. An appliance for indicating or correcting errors in printers' galleys, said appliance accommodating a galley and a proof thereof arranged parallel, and means movable longitudinally of the galley to any line of the proof, and a galley indicator movable longitudinally of the galley to any line thereof to determine the position of the corresponding line in the galley without reading the metallic proof thereof.

2. An appliance for indicating or correcting errors in printers' galleys, said appliance accommodating a galley and a proof thereof arranged parallel, line indicating means movable adjacent the proof and longitudinally of the galley to any line of the proof, a galley indicator movable longitudinally of the galley to any line thereof for indicating in the galley the line indicated in the proof, and means for adjusting the indicating means.

3. In an appliance for indicating or correcting errors in printers' galleys, said appliance accommodating a galley support, a proof support, a galley and a proof thereof, a first threaded shaft, means actuated by said shaft for indicating lines in the galley, a second threaded shaft, means for actuating the shafts synchronously, and means operated by the second threaded shaft for indicating lines of the proof.

4. In an appliance for indicating or correcting errors in printers' galleys, a galley support, a proof support, adjustable means for indicating the position of the proof in relation to said support, movable proof line indicating means adjacent said support, galley line indicating means moving synchronously with the proof line indicating means, and means for adjusting the proof line indicating means.

5. In an appliance for indicating or correcting errors in printers' galleys, a galley support, a proof support, means for holding the proof to said support, means for indicating the correct position of the proof upon the support, means for adjusting the position indicating means, a proof line indicating means moving adjacent the support, a galley stop against which the last line of the galley bears, means for rectifying differences between the length of the proof and the length of the column of type of the galley, and galley line indicating means moving synchronously with the proof line indicating means.

6. In an appliance for indicating or correcting errors in printers' galleys, said appliance accommodating a galley support, a proof support, a galley and a proof thereof, proof line indicating means, means for moving the line indicating means to any position upon the proof, synchronously moving means for indicating in the galley the line indicated on the proof, and means for retaining the type of the galley in a compact condition.

7. An appliance for indicating or correcting errors in printers' galleys, consisting of a framework having a proof holder, a galley mounted in said framework, an adjustable proof pointer arm carried by said framework, a first threaded shaft mounted in said framework, a second threaded shaft mounted in said framework, an adjustable indicating frame for the proof operated by the second threaded shaft, and a galley indicator operated by the first threaded shaft.

8. An appliance for indicating or correcting errors in printers' galleys, consisting of a framework having a proof holder, a galley stop, rollers mounted in said framework and supporting the galley, an adjustable pointer arm carried by the framework, first and second threaded shafts rotatable synchronously, an adjustable indicating frame controlled by the second shaft, a galley indicator controlled by the first shaft, weight actuated means for operating the first shaft, and a spring controlled galley slug compressor lever moving over the galley with the movement of the galley indicator.

In testimony whereof we have hereunto affixed our signatures in the presence of two subscribing witnesses.

THOMAS BURDEN.
ERNEST ABBOTT MARTIN.

Witnesses:
C. O'MAHONY,
Y. C. BAIRE.

Copies of this patent may be obtained for five cents each, by addressing the "Commissioner of Patents, Washington, D. C."